United States Patent [19]

Tadayon

[11] Patent Number: 4,999,101
[45] Date of Patent: Mar. 12, 1991

[54] PREHEAT INDICATOR

[75] Inventor: Fereshteh Tadayon, Asheville, N.C.

[73] Assignee: Alusuisse Lonza-Services Ltd, Zurich, Switzerland

[21] Appl. No.: 430,595

[22] Filed: Nov. 2, 1989

[51] Int. Cl.⁵ .............................................. B01D 39/14
[52] U.S. Cl. .................................. 210/85; 210/510.1; 75/407; 266/99; 266/227
[58] Field of Search ...................... 210/85, 149, 510.1; 75/407; 266/44, 99, 227; 252/68, 408, 962

[56] References Cited

U.S. PATENT DOCUMENTS

| 3,893,917 | 7/1975 | Pryor et al. | 210/510.1 |
| 3,947,363 | 3/1976 | Pryor et al. | 210/510.1 |
| 4,081,371 | 3/1978 | Yarwood et al. | 210/510.1 |
| 4,166,058 | 8/1979 | Svigelj et al. | 523/457 |
| 4,331,621 | 5/1982 | Brockmeyer | 264/44 |

Primary Examiner—W. Gary Jones
Attorney, Agent, or Firm—Bachman & LaPointe, P.C.

[57] ABSTRACT

The present invention relates to a ceramic body suitable for use in molten metal filtration applications having a built-in preheat indicator and method for forming such a ceramic body. The preheat indicator comprises a dye having a burnoff temperature substantially equal to the desired preheat temperature applied to a surface of the ceramic body. In a preferred embodiment, the dye comprises an aniline dye such as Backmeier's crystal violet.

16 Claims, 1 Drawing Sheet

4,999,101

PREHEAT INDICATOR

BACKGROUND OF THE INVENTION

The present invention relates to a preheat indicator for use with ceramic foam filters and a method for forming the indicator. The indicator is primarily used in molten metal filter applications to show that the filter has been preheated to a desired temperature so that filtration of molten metal can commence.

Ceramic filter bodies have been used commercially in the filtration of molten metals such as molten iron and molten aluminum for quite some time. U.S. Pat. Nos. 3,893,917 and 3,947,363, both to Pryor et al., 4,081,371 to Yarwood et al. and 4,331,621 to Brockmeyer illustrate some of the ceramic bodies used to filter molten metals.

Such ceramic filter bodies are normally preheated prior to commencement of molten metal filtration to protect the filter body from a thermal shock point of view and to expand gasket materials surrounding the filter. Improperly heated filters can result in the following problems:

1. metal bypass due to incomplete expansion of the expandable gasket;
2. filter breakage due to thermal shock;
3. metal freezing due to a cold filter body receiving near solidification point melt;
4. filter breakage in cases of uneven filter support due to uneven pressure exerted on the filter body by higher than usual priming head caused by filtration attempt through a cold filter; and
5. introduction of hydrogen ions into the melt through gasket gas byproducts.

Preheating, if done correctly can minimize these problems and clear the way for a clean, safe, efficient filtration. However, this simple task may not always be done properly. For example, the burners may not heat the filter to the desired temperature due to burner inefficiency or they may not heat the filter uniformly across its width.

As yet, there is no commercially available filter body having a mechanism for providing a signal of any type which shows that the filter body has been adequately preheated and filtration can now be commenced. The present invention overcomes this shortcoming through the provision of a preheat indicator for molten metal filter bodies.

Accordingly, it is an object of the present invention to provide a preheat indicator for ceramic body molten metal filters which signals that the ceramic body has been preheated to a desired temperature.

It is a further object of the present invention to provide a preheat indicator as above which signals that the body has been substantially uniformly heated across its width.

It is yet a further object of the present invention to provide a preheat indicator as above which is relatively simple to apply to a ceramic filter body and to use.

These and further objects and advantages will become more apparent from the following description and drawings in which like reference numerals depict like elements.

SUMMARY OF THE INVENTION

The foregoing objects and advantages are achieved by the preheat indicator of the present invention which comprises an indicia material such as a dye having a burnoff temperature substantially equal to the temperature to which a ceramic body is to be heated prior to use. The invention described herein has particular utility with ceramic bodies used in molten metal filtration applications.

In a preferred embodiment, the preheat indicator comprises an aniline dye applied to a plurality of locations on a surface of the ceramic body. As the ceramic body is heated to a desired temperature, the dye fades. When it completely disappears, a user knows that the body has been heated to the desired temperature. The dye is applied to a plurality of locations on the surface of the body so as to indicate when the body has been substantially uniformly heated to the desired temperature.

The indicator dye is applied to the ceramic body by preparing an aqueous solution containing from about 0.01 g/l to about 30 g/l of the dye, dipping a stamping tool into said solution, and applying a spot of said dye to one or more locations on the ceramic body using said tool. A template is used to determine the location(s) where the dye is to be applied.

DETAILED DESCRIPTION OF THE PREFERRED EMBODIMENT(s)

Figure 1:
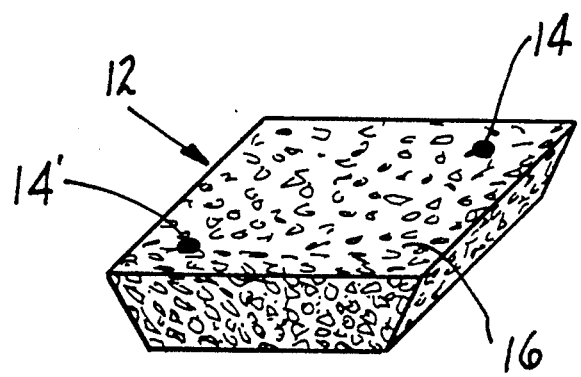
FIG. 1 is a perspective view of ceramic filter body with the preheat indicator of the present invention.

Porous ceramic bodies have been used in molten metal filtration applications because of their excellent thermal and mechanical properties. Filters such as the filter body 12 shown in FIG. 1 are typically produced by a replication process which in its most basic form comprises immersing a porous combustible foam material such as polyurethane foam in a thixotropic ceramic slurry and firing the impregnated foam material to burn off the foam material and produce a porous ceramic body. U.S. Pat. Nos. 3,947,363 to Pryor et al., 4,024,212 to Dore et al., 4,254,659 to Blome, 4,391,918 to Brockmeyer and 4,610,832 to Brockmeyer, which are hereby incorporated by reference herein, illustrate suitable processes for forming ceramic filter bodies for use in filtering molten metal such as molten aluminum, molten iron, and molten steel. These ceramic bodies are typically characterized by an open cell structure having a plurality of interconnected voids surrounded by a web of ceramic material.

As previously discussed, molten metal filter bodies are typically preheated prior to initiation of molten metal flow through the filters. It has been found that preheating the ceramic bodies helps protect the bodies from a thermal shock point of view and assists in fully expanding certain gasket materials surrounding the periphery of the filters. U.S. patent application Ser. No. 356,076 to Tadayon, which is hereby incorporated by reference herein, illustrates one such expandable gasket material. Preheating may be carried out using any suitable means known in the art such as burners. The temperature to which the body is preheated depends upon the type of metal being filtered. For molten aluminum, the body is typically preheated to a temperature in the range of from about 400° F. to about 1200° F. for a time in the range of from about 5 minutes to about 30 minutes.

The important ingredients of proper preheating are temperature and time. To insure that these two ingredients are properly carried out, the present invention makes use of a visible indicia material 14 having a burnoff temperature matched to the correct filter preheat temperature. Thus, as the filter is being heated to the proper temperature, the indicia material oxidizes and burns off. When the filter is properly preheated, the material 14 is no longer visible.

It has been found that a suitable indicia material comprises an aqueous aniline dye solution containing from about 0.01 g/l to about 30 g/l, preferably from about 0.06 g/l to about 3.0 g/l, of the dye. Aniline dyes comes in powder form and may be easily mixed with water. For molten aluminum filtration bodies, it has been found that Backmeier's crystal violet is a particularly useful dye material since it burns off at a temperature in the range of from about 400° F. to about 1200° F.

The dye is applied to the molten metal inlet surface 16 of the filter body 12 so as to form the indicia 14. The indicia 14 may be one or more dots, one or more stripes, and the like. Preferably, the visible indicia comprises two dots 14 and 14' located at opposed edges of the surface 16. By locating the dots 14 and 14' at opposed edges, one can receive a visual indication that the filter body has been suitably preheated to the desired temperature across substantially its entire width.

The dots may be applied to the surface 16 using a stamping tool not shown having a cylindrical tip formed from a foam material glued to a wooden rod handle. The tip material may comprise a 50 ppi polyurethane foam material having a one inch diameter and any desired length. The tip may be bonded to the handle using any suitable adhesive known in the art.

Figure 2:
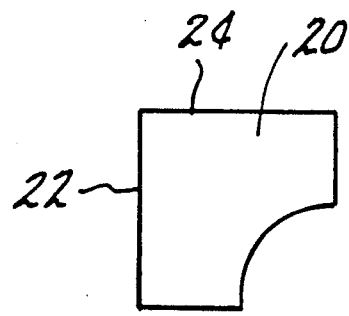
FIG. 2 illustrates a template used to position the preheat indicator.

A template 20 such as that shown in FIG. 2 may be used to locate the desired position for the dot. The template may be made out of a clear plastic material with a designated spot, i.e., two inches from the corner of the filter, for the indicator dot.

To locate the desired position for the dot 14 or 14', the template 20 is placed at the corner of the surface 16 with the straight edges 22 and 24 of the template matching those of the filter body. The foam tip of the stamping tool is then impregnated with the dye by immersing it into the indicator solution. The dot 14, 14' is formed by pressing the impregnated tip at the designated spot on the filter. The steps are then repeated on the opposite side of the filter to locate the other dot. While it is preferred to apply just two dots, it should be apparent that the filter surface could be imprinted with any desired number of dots at any number of different locations.

As previously discussed, the dye forming the indicators 14, 14' oxidizes and burns off as the filter body is heated. When the desired preheat temperature has been reached, the dots 14, 14' disappear or fade thereby providing the user with a signal to start the molten metal filtration.

It should be recognized that other dyes having other burnoff temperatures could be used in the indicator solution. For example, one would use a dye having a burnoff temperature in the range of from about 1000° F. to about 2900° F. if the filter body is used to filter molten steel.

It is apparent that there has been provided in accordance with this invention a preheat indicator which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An indicator for use with a ceramic body for indicating that said body has been substantially uniformly heated to a desired preheat temperature, said indicator comprising:
    a visible indicia material applied to a ceramic body, said material having a burnoff temperature substantially equal to said desired preheat temperature and providing a visible indication when said body has been substantially uniformly heated to said desired temperature.

2. The indicator of claim 1 wherein said material is applied to at least two locations on a surface of said body so as to indicate that said body has been substantially uniformly heated throughout.

3. The indicator of claim 2 wherein said material comprises a dye which fades after said body has been heated to said desired temperature and said dye is applied to a surface of said ceramic body at two opposed corners.

4. The indicator of claim 1 wherein said material comprises a dye which fades after said body has been heated to said desired temperature.

5. The indicator of claim 4 wherein said dye comprises an aniline dye having a burnoff temperature substantially equal to said desired preheat temperature.

6. The indicator of claim 4 wherein said dye has a burnoff temperature in the range of from about 400° F. to about 1200° F.

7. A ceramic filter body for use in filtering molten metal having a built-in preheat indicator, said filter body comprising:
    a body having a desired shape formed from a porous ceramic body having a series of interconnected voids;
    said body having an inlet surface through which molten metal to be filtered enters said body; and
    at least one preheat indicator positioned on said surface to signal when said body has been heated prior to filtration to a desired temperature.

8. The ceramic filter body of claim 7 wherein said at least one preheat indicator comprises at least one dot of a dye having a burnoff temperature substantially equal to said desired temperature.

9. The ceramic body of claim 8 wherein said dye comprises a dye having a burnoff temperature in the range of from about 400° F. to about 1200° F.

10. The ceramic body of claim 9 wherein said dye comprises an aniline dye.

11. The ceramic body of claim 9 wherein said dye comprises an aqueous solution containing from about 0.01 g/l to about 30 g/l of an aniline dye.

12. The ceramic body of claim 8 wherein at least two dots of said dye are positioned along opposed edges of said filter body so as to indicate that said filter body has been substantially uniformly preheated throughout to said desired temperatures.

13. A method for forming a ceramic foam filter body having an indicator for indicating that a desired preheat temperature has been reached, said method comprising the steps of:

forming a porous ceramic body having a plurality of interconnected voids; and applying indicia formed from a dye having a burnoff temperature substantially equal to said preheat temperature to a surface of said porous ceramic body.

14. The method of claim 13 wherein said applying step comprises:

preparing an indicator solution having a burnoff temperature in the range of from about 400° F. to about 1200° F.;

dipping a tip of a stamping tool into said indicator solution; and pressing said tip onto said surface at a first designated spot.

15. The method of claim 14 wherein said applying step further comprises pressing said tip onto said surface at a second designed spot at an opposite side of said surface.

16. The method of claim 14 wherein said preparing step comprises forming an aqueous solution containing from about 0.01 g/l to about 30 g/l of an aniline dye.

* * * * *